(12) United States Patent
Benedict et al.

(10) Patent No.: US 7,850,412 B2
(45) Date of Patent: Dec. 14, 2010

(54) OVERHEAD BOAT STORAGE SYSTEM

(75) Inventors: Charles E. Benedict, Tallahassee, FL (US); Brian G. Pfeifer, Tallahassee, FL (US); Christian A. Yates, Tallahassee, FL (US); Scott K. Bladen, Bristol, FL (US); Richard E. Lackinger, Tallahassee, FL (US); James R. Dobbs, Tallahassee, FL (US)

(73) Assignee: BEC Companies, Inc., Tallahassee, FL (US)

( * ) Notice: Subject to any disclaimer, the term of this patent is extended or adjusted under 35 U.S.C. 154(b) by 787 days.

(21) Appl. No.: 11/743,531

(22) Filed: May 2, 2007

(65) Prior Publication Data
US 2008/0075568 A1  Mar. 27, 2008

Related U.S. Application Data

(60) Provisional application No. 60/826,832, filed on Sep. 25, 2006.

(51) Int. Cl.
*B65G 1/04* (2006.01)
*B63B 35/44* (2006.01)
(52) U.S. Cl. .................... 414/281; 414/807; 114/44
(58) Field of Classification Search ............ 414/281, 414/283, 284; 114/44, 263
See application file for complete search history.

(56) References Cited

U.S. PATENT DOCUMENTS

| 2,440,307 | A | | 4/1948 | Smith |
| 2,675,131 | A | * | 4/1954 | Osojnak ............... 212/331 |
| 2,963,310 | A | | 12/1960 | Abolins |
| 3,189,198 | A | | 6/1965 | Filak |
| 3,220,571 | A | | 11/1965 | Kummerman |
| 3,252,603 | A | | 5/1966 | Davis |
| 3,372,817 | A | * | 3/1968 | Conklin ................ 414/264 |
| 3,385,458 | A | | 5/1968 | Gresham |
| 3,498,477 | A | | 3/1970 | Sommer |
| 3,513,999 | A | | 5/1970 | Slater et al. |
| 3,558,176 | A | | 1/1971 | Fathauer et al. |
| 3,604,743 | A | | 9/1971 | Kinkopf |
| 3,687,309 | A | | 8/1972 | Macrander |

(Continued)

FOREIGN PATENT DOCUMENTS

DE    3103162    8/1982

(Continued)

*Primary Examiner*—Charles A Fox
(74) *Attorney, Agent, or Firm*—Dowell & Dowell, PC

(57) ABSTRACT

A system and method for the safe storage of boats wherein a storage structure is provided having a first section in which boats are stored in vertically oriented cells with each boat being carried within a boat storage unit such that the units may be stacked one upon another and wherein at least one transfer vehicle is provided for selectively engaging and conveying the boat storage units along an overhead grid track system between the first section and a second section wherein the grid track system is at least partially oriented over a body of water such that the at least one transfer vehicle may be used to either lift or lower a boat contained within a boat storage unit relative to the body of water and move the storage unit to and from a storage position in one of the vertical storage cells of the first section of the storage structure.

20 Claims, 16 Drawing Sheets

U.S. PATENT DOCUMENTS

| | | | | |
|---|---|---|---|---|
| 3,774,625 | A | * | 11/1973 | Wiltrout .................. 134/104.2 |
| 3,786,942 | A | | 1/1974 | Dane, Jr. |
| 4,043,285 | A | | 8/1977 | Nordstrom |
| 4,070,979 | A | | 1/1978 | Otis et al. |
| 4,158,416 | A | | 6/1979 | Podesta |
| 4,172,685 | A | | 10/1979 | Nabeshima et al. |
| 4,190,013 | A | | 2/1980 | Otis et al. |
| 4,666,356 | A | | 5/1987 | Newbury |
| 4,973,219 | A | | 11/1990 | Brickner et al. |
| 5,062,242 | A | | 11/1991 | Corcoran |
| 5,140,787 | A | | 8/1992 | Corcoran |
| 5,314,262 | A | | 5/1994 | Meisinger et al. |
| 5,354,112 | A | | 10/1994 | Hara et al. |
| 5,540,532 | A | | 7/1996 | Carder et al. |
| 5,560,663 | A | | 10/1996 | Hara et al. |
| 5,769,589 | A | | 6/1998 | Lubbers |
| 5,915,906 | A | | 6/1999 | Lucking et al. |
| 6,007,288 | A | | 12/1999 | Maffett et al. |
| 6,161,887 | A | | 12/2000 | Shiota et al. |
| 6,220,173 | B1 | | 4/2001 | Sauerwein |
| 6,572,319 | B1 | | 6/2003 | Simmons, III et al. |
| 7,112,007 | B2 | * | 9/2006 | Maffett et al. .................. 405/3 |
| 7,194,971 | B2 | * | 3/2007 | Stolzer ....................... 114/44 |
| 7,402,017 | B2 | * | 7/2008 | Stolzer ....................... 414/281 |
| 2005/0220573 | A1 | | 10/2005 | Benedict et al. |
| 2006/0180069 | A1 | | 8/2006 | Stolzer |
| 2007/0031218 | A1 | * | 2/2007 | Haag ......................... 414/227 |
| 2009/0308000 | A1 | * | 12/2009 | Corcoran .................. 52/173.1 |

FOREIGN PATENT DOCUMENTS

| | | |
|---|---|---|
| EP | 0365086 | 10/1989 |
| JP | 60093006 | 5/1985 |
| JP | 61114905 | 6/1986 |
| JP | 02085470 | 3/1990 |
| JP | 02236365 | 9/1990 |
| JP | 03066876 | 3/1991 |
| JP | 07172317 | 7/1995 |

* cited by examiner

OVERHEAD BOAT STORAGE SYSTEM

CROSS-REFERENCE TO RELATED APPLICATIONS

This application claims priority to U.S. provisional application No. 60/826,832, filed on Sep. 25, 2006, entitled "Overhead Boat Storage System," which is hereby incorporated by reference in its entirety.

BACKGROUND OF THE INVENTION

1. Field of the Invention

This application is directed to an overhead storage system for boats wherein the boats may be manipulated by one or more overhead transfer units that can lift or elevate the boats and maneuver them into vertically oriented storage cells or into vertical stacks without cell guides, all without the need to use conventional cranes and forklifts and in such a manner as to maximize storage space by eliminating the need for internal isles for manipulating and/or boat handling equipment.

2. Brief Description of the Related Art

Boat owners have a choice of trailing their boats to or from launch sites or maintaining them in docking facilities such as wet boat slips at commercial marinas. In off season, however, the boats must often need to be stored in a dry dock manner such as to be protected from adverse weather conditions. Some owners opt to store smaller pleasure boats in home garages or under cover of some structure that will protect the boats from direct contact with the elements such as sun, rain, ice, hail and snow.

Others are willing to pay to have their boats stored in covered boat slips available at many marinas or on trailers in storage yards of such marinas. Under such conditions, not only are the boats subject to possible adverse weather conditions, but they are also subject to possible vandalism.

In order to provide maximum protection and safety for smaller stored boats, many owners are willing to pay for secured, interior, dry dock warehouse type storage wherein boats are elevated by fork lifts or special traveling cranes that place the boats on storage racks within an enclosed facility. In most such facilities, only one vertical set of racks is positioned on opposite sides of each isle that is traversed by the boat handing vehicle or lift. In most conventional storage facilities, the storage capabilities are also limited by the size and vertical reach of the forklifts and other carriers used to elevate boats into storage racks or bins.

As the space along the waterways becomes increasingly more congested and expensive, there is a need to provide an alternate to such conventional methods of boat storage which provides for maximizing the storage capacity of enclosed storage areas to thereby increase the number of safe and preferred enclosed storage facilities but also to make storage systems more cost effective to thereby reduce the storage costs to boat owners.

SUMMARY OF THE INVENTION

The present invention is directed to a storage structure and method of safely and compactly storing boats wherein a first section of the storage structure includes vertical storage cells in which a plurality of boat storage units may be selectively stacked in predetermined positions such that the retrieval of a boat from a stored position is easily accomplished using an overhead track system along which at least one transfer vehicle is movably powered. A portion of a grid track system extends along a second section of the storage structure so as to be at least partially positioned above a body of water such that the at least one transfer vehicle may be maneuvered over the body of water to either launch or retrieve a boat from the body of water. The system may be entirely automated such that by keying in a PIN number or code carried by a readable card can control the movement of the at least one transfer vehicle.

In preferred embodiments, a plurality of transfer vehicles may be operable simultaneously along the grid track system with each vehicle including s first drive mechanism for moving the vehicle in a first direction and second drive mechanism for moving the vehicle in a second direction generally perpendicular to the first direction. Each vehicle carries a hoist assembly for controlling a lifting frame that is selectively engageable with one of the boat storage units. In some embodiments, the lifting frames may be connected to the vehicles so as to be rotatable with respect thereto.

The boat storage units are designed to support given sizes of boats therein, and the system may include units of different sizes to accommodate boats of different sizes and/or structures. Each unit includes at least one and preferably a plurality of boat supporting cradles and wherein, when the units are at least partially submerged in water, a boat may be floated onto or from the cradles. In the preferred embodiments, each boat storage unit includes a frame structure that permits the units having boats therein to be stacked one on top of another. In some embodiments, the frame structure may be covered by wall coverings to thereby substantially enclose a boat within the storage unit.

In other embodiments of the invention, the storage structure includes at least one spray area wherein boats supported within the storage units may be conveyed by the transfer vehicles so that the boats may be sprayed or cleaned prior to being placed into storage within the first section of the storage structure. Water from the spray area may be collected, filtered and recycled.

It is the primary object of the present invention to provide a boat storage facility that maximizes storage capabilities and reduces the necessary land area to safely and practically store boats, for either short or long term periods of time, by allowing the boats to be stored in storage units that may be vertically stacked one upon the other and in side-by-side and in end-to-end relationship such that the need for internal aisles and spacings for maneuvering ground based lifts, machinery and vehicles used in conventional storage systems is not necessary.

It is another object of the invention to provide a boat storage system that can easily be automated such that a number of on hand operators and attendants is reduced and such that the convenience of the system to boat owners is facilitated and allows full time access to owners to store or retrieve their boats, as desired.

It is yet a further object of the invention to provide a boat storage system wherein the boats are protectively stored in storage units in such a manner that damage to a boat being maneuvered with the storage system is minimized and wherein the system facilitates the cleaning of boats prior to storage while continuously moving boats within the storage system.

BRIEF DESCRIPTION OF THE DRAWINGS

A better understanding of the invention will be had with reference to the attached drawings wherein.

DESCRIPTION OF THE PREFERRED EMBODIMENTS

Figure 1:
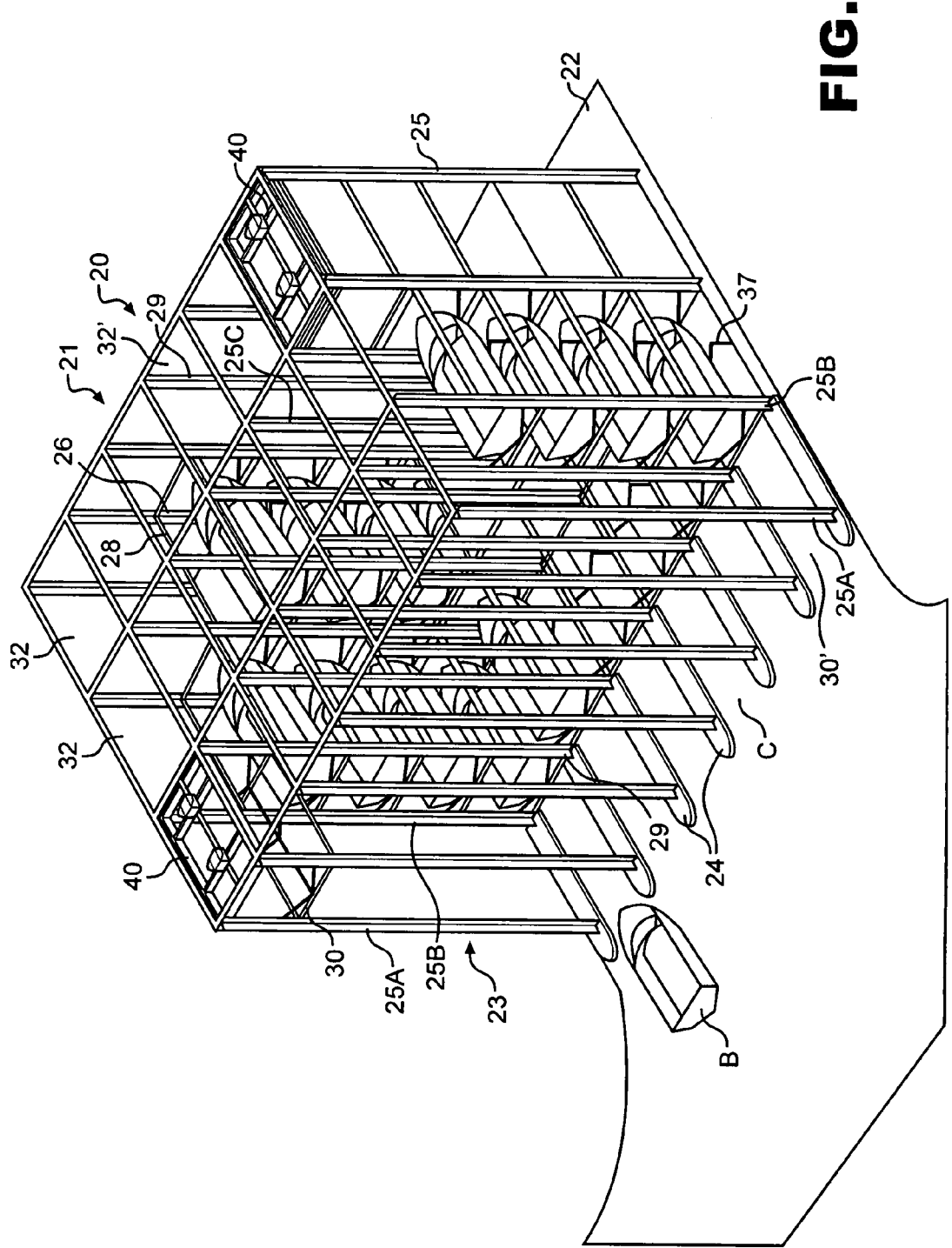
FIG. 1 is a perspective view of a first embodiment of boat storage facility in accordance with the teachings of the present invention illustrating a boat approaching the facility.

The present invention is directed to facilities and methods for safely and efficiently storing boats that allows maximum use to be made of limited areas adjacent waterways. The facilities of the invention are designed and configured to permit a maximum number of boats to be stored within a given space and yet be easily accessible when needed for launching, repair, or other use. The facilities described herein are generally fully enclosed structures having outer side walls and roof that protect boats being stored from ambient weather conditions with the roof "R" being cut away and walls being removed to facilitate the description of the storage systems. Further, although the facilities described herein are preferably structured to permit boats and other water craft, such as jet skis and the like, to be elevated directly from the water when being moved to storage and being directly lowered into the water when being launched, the system and facilities may be used to elevate boats from trailers and other vehicles or to lower boats directly onto trailers or other vehicles for travel or shipment.

The size of water craft that can be stored using the teachings of the present invention may vary from small non-powered craft to larger inboard and outboard boats. Therefore, the use of the term "boat" herein is not limited to any specific type or style of water craft. Generally, however, as the systems are designed to permit vertical storage of the water craft without the need for individual storage racks or bins, water craft of generally the same size will generally be vertically stacked relative to one another.

With specific reference to FIGS. 1-4, a first embodiment of boat storage facility will be described. In this embodiment, the facility includes a large warehouse-like structure 20 that includes an inner portion 21 that is supported on a solid foundation 22 that may be elevated or built up with respect to an adjacent waterway. The waterway may be a marina or other docking facility. Although the entire structure may be built on solid ground, in the embodiment shown, a front portion 23 of the structure is built having a number of spaced pier-like members 24 that define small water channels "C" there between in which boats "B" to be elevated to storage or launched from storage are easily maneuvered. Each of the piers is provided with spaced vertical columns 25 that have cross sections defined by one or more vertical guide flanges that are oriented at generally right angles relative to one another so that corners 26 of special boat storage units 28 in which the boats are stored are guidingly engageable therewith, as will be described in greater detail hereinafter, as boats are elevated from or lowered toward the water channels. Although each column may have the same cross section, the inner columns 25C will preferably have "+" shaped cross sections so as to define four guide channels 29, while end and side columns 25B will have generally T-shaped cross sections defining two opposing guide channels 29 and corner columns 25A will have L-shaped flanges defining a single guide channel 29.

Each set of four adjacent columns that face one another define an open vertical storage cell 30 of a size to guidingly receive the boat storage units 28 of the invention as they are raised or lowered. This guidance feature will ensure that boats being handled are constrained to follow a predetermined vertical path and are not accidentally damaged. In a like manner, the inner portion 21 of the structure includes similar vertical columns 25 that are spaced to define a plurality of open storage cells 32 in which a plurality of boats, each housed within one of the boat storage units, may be stored in stacked vertical relationship relative to one another.

Figure 2:
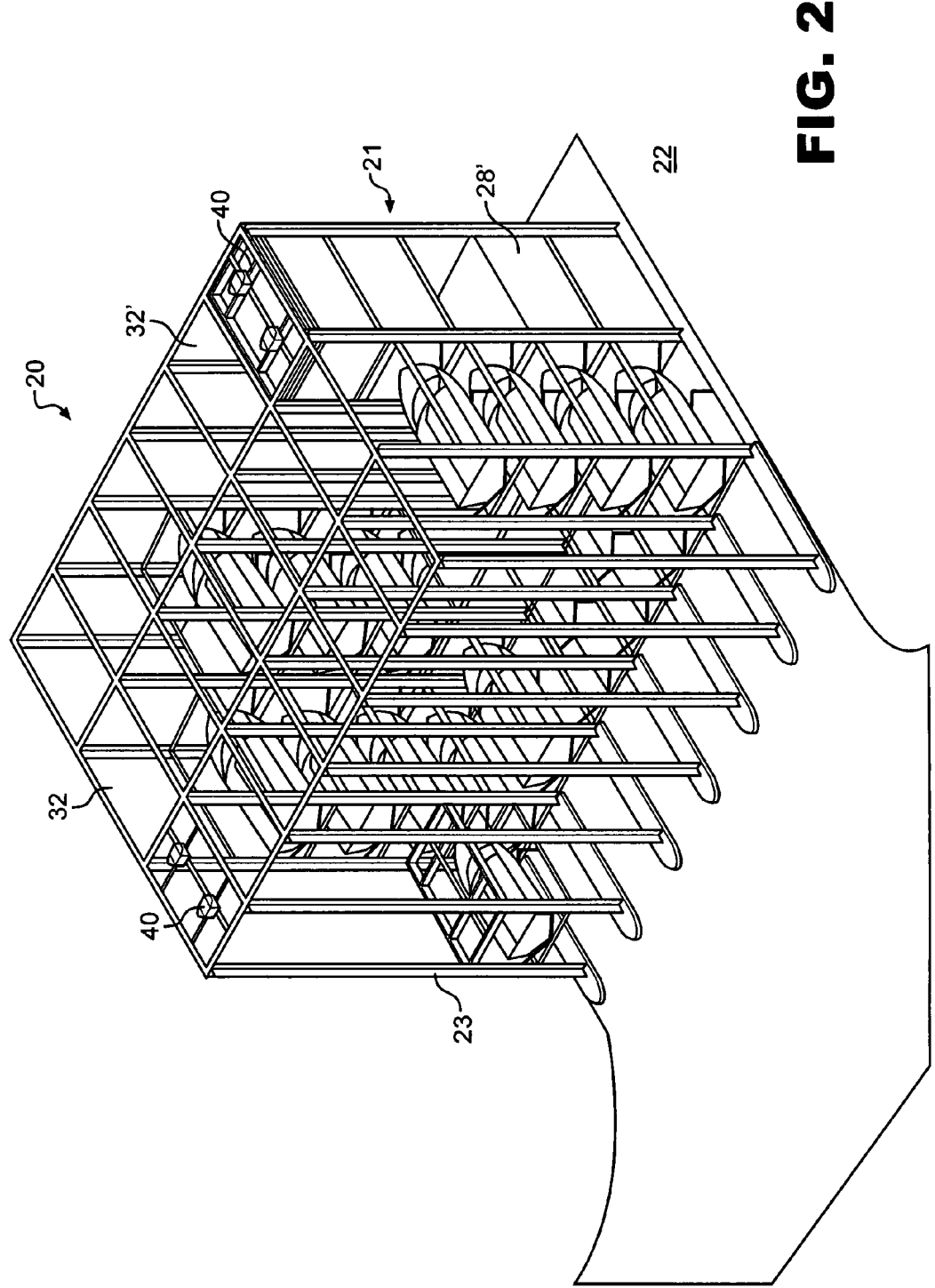
FIG. 2 is a view similar to FIG. 1 showing the boat being elevated by the specialized overhead lift and transfer unit of the invention.

As shown in FIG. 2, each boat storage unit 28 is formed as an open box frame structure having upper and lower generally rectangular frames 34 and 35 that are connected at their four corners by vertical struts 36. Secured, such as by welding within each storage unit, are at least two spaced and generally V-shaped cradles 37 on which the boats are seated as they enter the storage units through an open end thereof. The V-shaped cradles 37 automatically adjust to the various hull shapes of individual boats. In the embodiment shown in FIGS. 1-4, three such cradles are used, although other configurations can be used. To protect the finish of the stored boats, the cradles 37 are preferably covered with non-metallic fabrics and rubber-like material pads or the like. Although most of the boat storage units 28 are shown in the drawings as open frame structures that are preferably made of steel or similar metal, it is possible that the storage units may be substantially enclosed on the bottom, sides and top thereof as shown at 28', however, it is preferred that sufficient openings are provided in the enclosed storage unit walls to permit air flow there through so as to prevent any development of mold or mildew. Further, at least one end of each storage unit must be open to permit entry and exit of a boat relative thereto when the storage units are positioned in the water. The open ends may be selectively closed when necessary.

The boat storage units 28,28' are reinforced as necessary and depending upon the size and weight of boats that are to be stored therein. Also, by providing additional or adjustable cradles 36 within the storage units, boats of different sizes may be selectively stored therein. The storage units are designed to be vertically stacked upon one another, and in the embodiment of FIGS. 1-4, four storage units are provided within most of the open cells 32 with an upper cell space 32' being left free to permit unobstructed passage of the storage units 28,28' over the various storage cells. Further, at least one of the storage cells 32 or retrieval or launching cells 30 is purposely left open, see 32' or 30', so as to permit the boat storage units to be temporarily placed therein when it becomes necessary to move storage units that are spaced above storage units housing boats that are to be retrieved for use, maintenance or the like.

Figure 3:
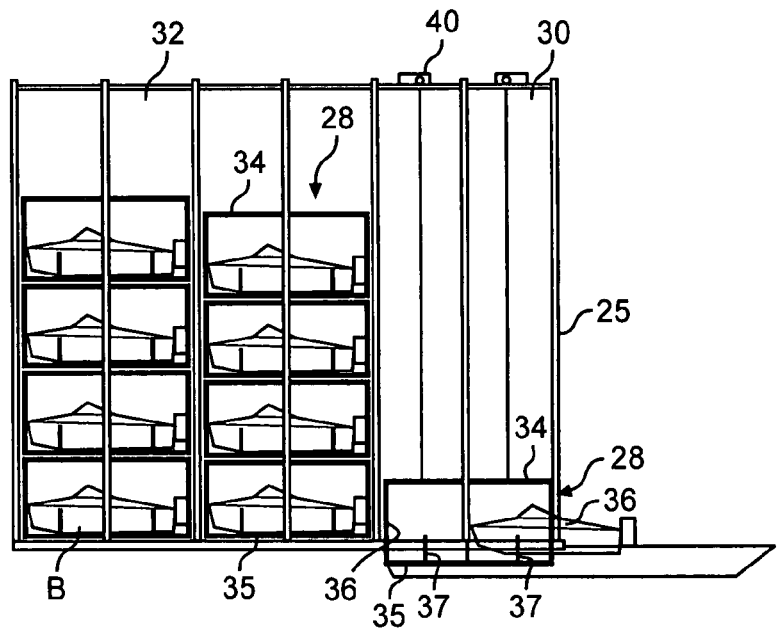
FIG. 3 is an enlarged side view of the facility of FIG. 1 showing the boat being maneuvered over a storage unit carried by a lift and transfer unit of the invention.
Figure 4:
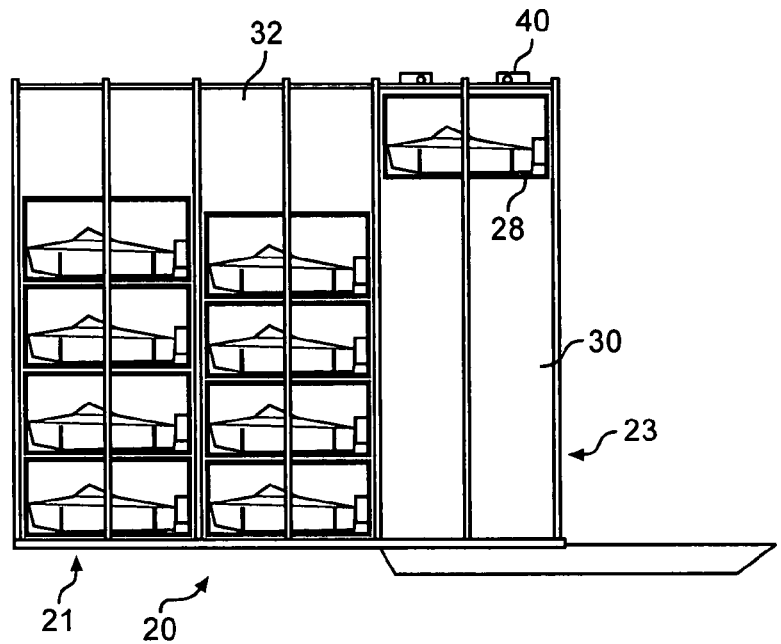
FIG. 4 is a side view showing the boat being completely elevated over a plurality of vertical guide beams that define vertical open storage cells within the storage facility of FIG. 1 in which the boats supported in the storage units are vertically stacked relative to one another with the at least one of the vertical cells left free to permit temporary transfer of boats and storage units when access is needed to retrieve boats stored at lower levels of the storage facility for launch or maintenance.
Figure 5:
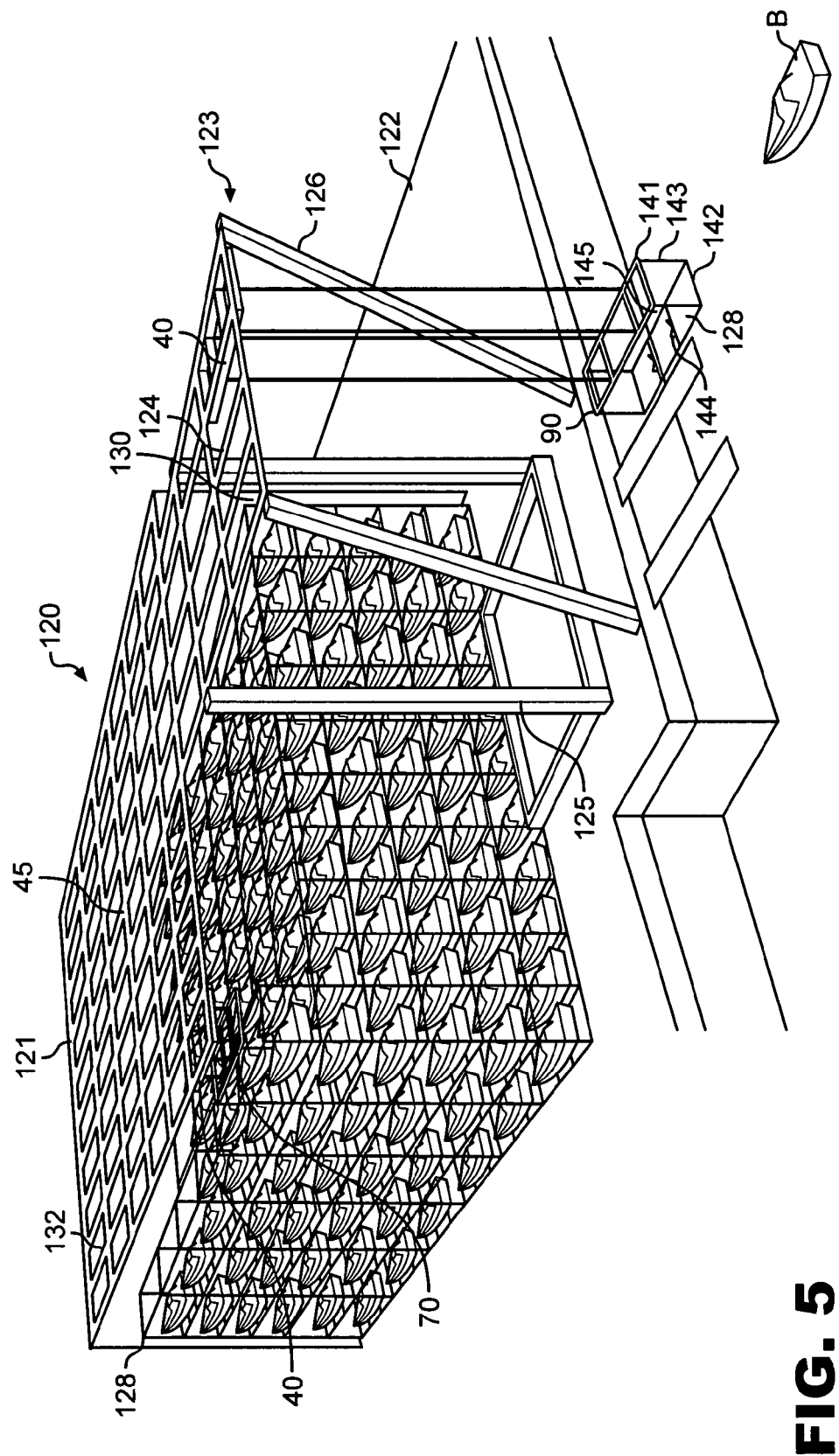
FIG. 5 is a perspective view of another embodiment of boat storage facility in accordance with the teachings of the present invention showing an overhead track system along which a lift and transfer unit of the invention is movable and illustrating a boat storage unit being lowered to receive an approaching boat.
Figure 6:
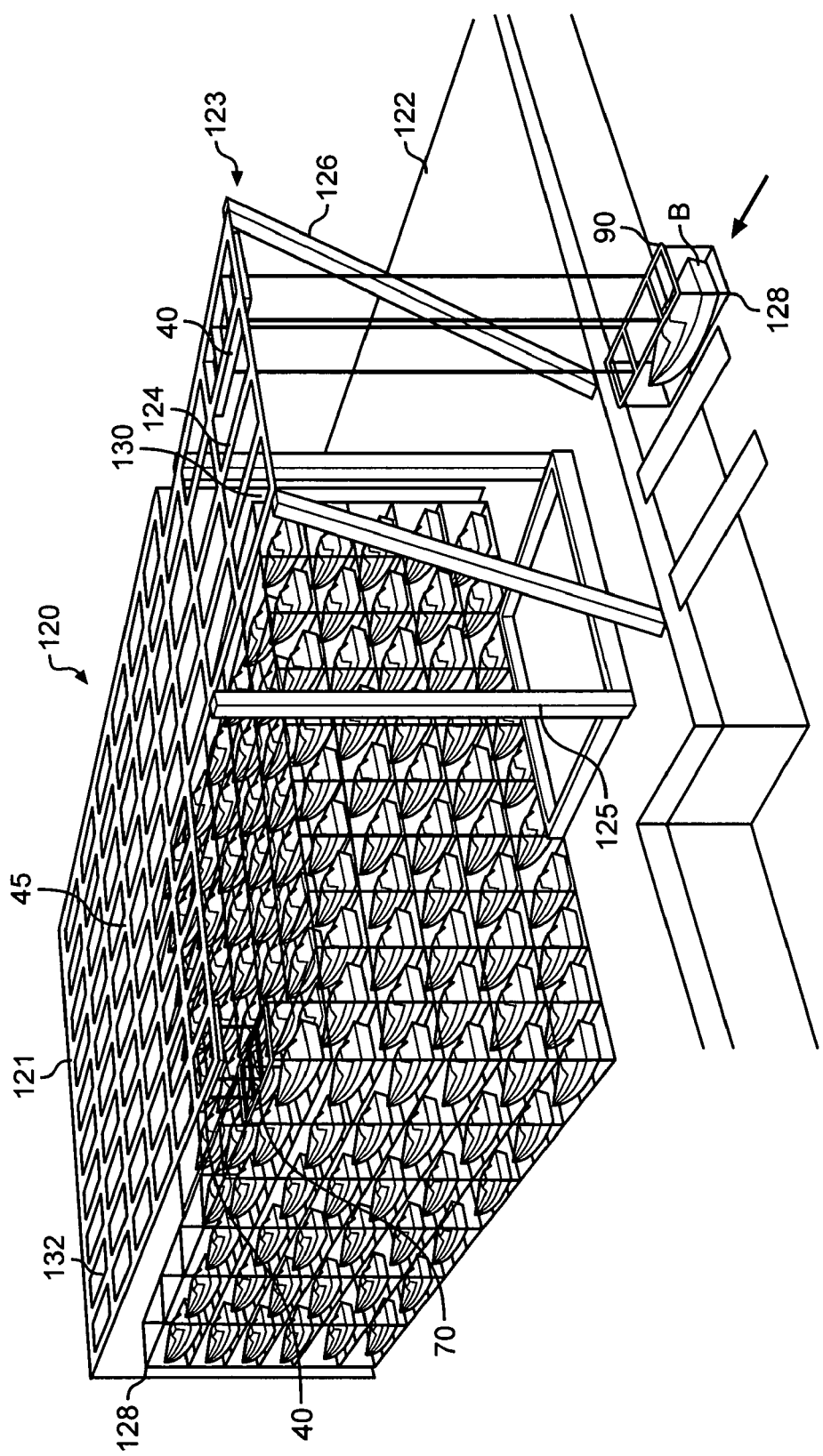
FIG. 6 is a view similar to FIG. 5 illustrating the boat being floated onto the cushioned, self-adjusting V-shaped racks within the boat storage unit.
Figure 7:
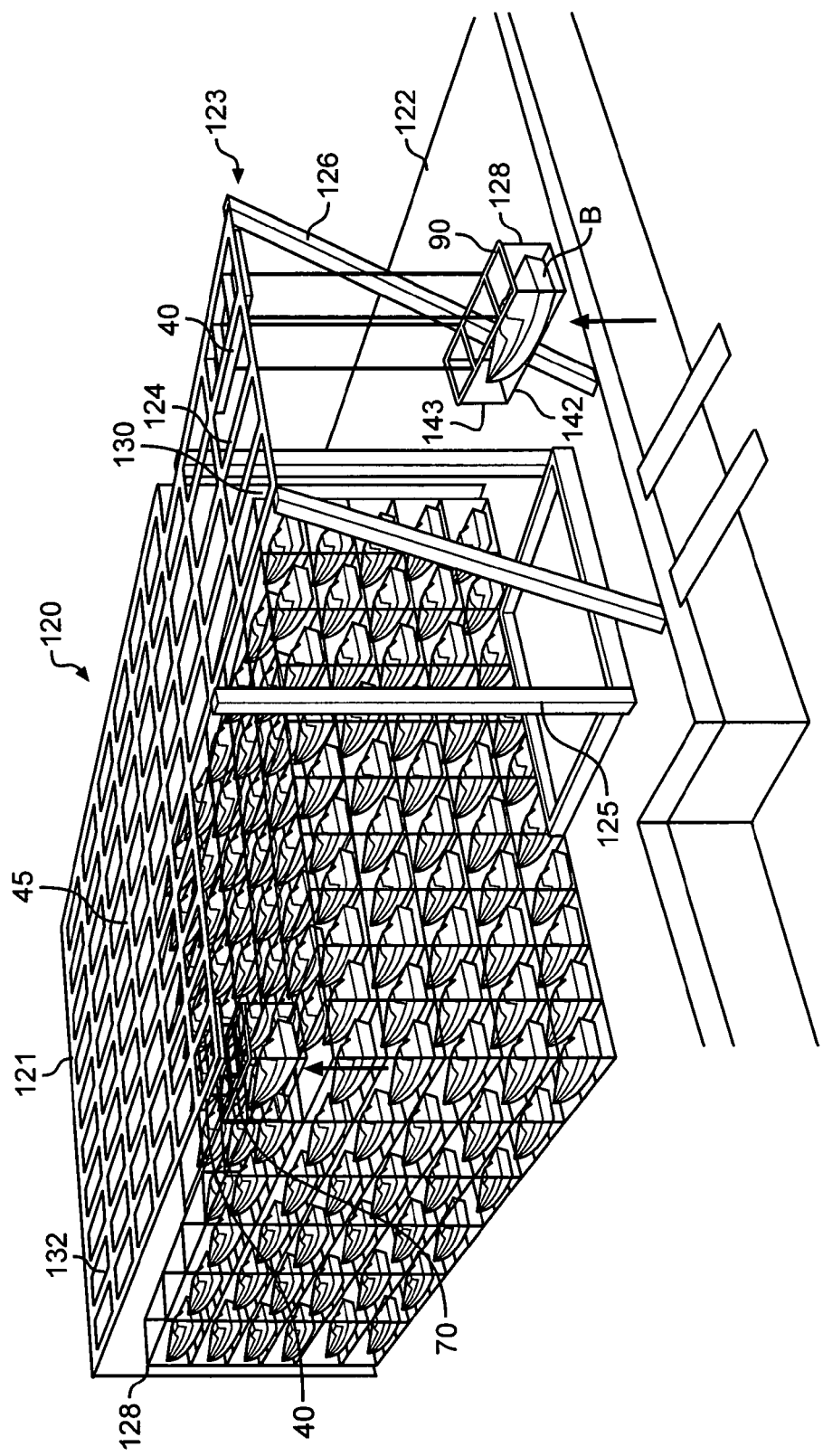
FIG. 7 is a view similar to FIG. 6 illustrating the boat within the storage unit being vertically elevated toward one of the transfer units of the invention.
Figure 8:
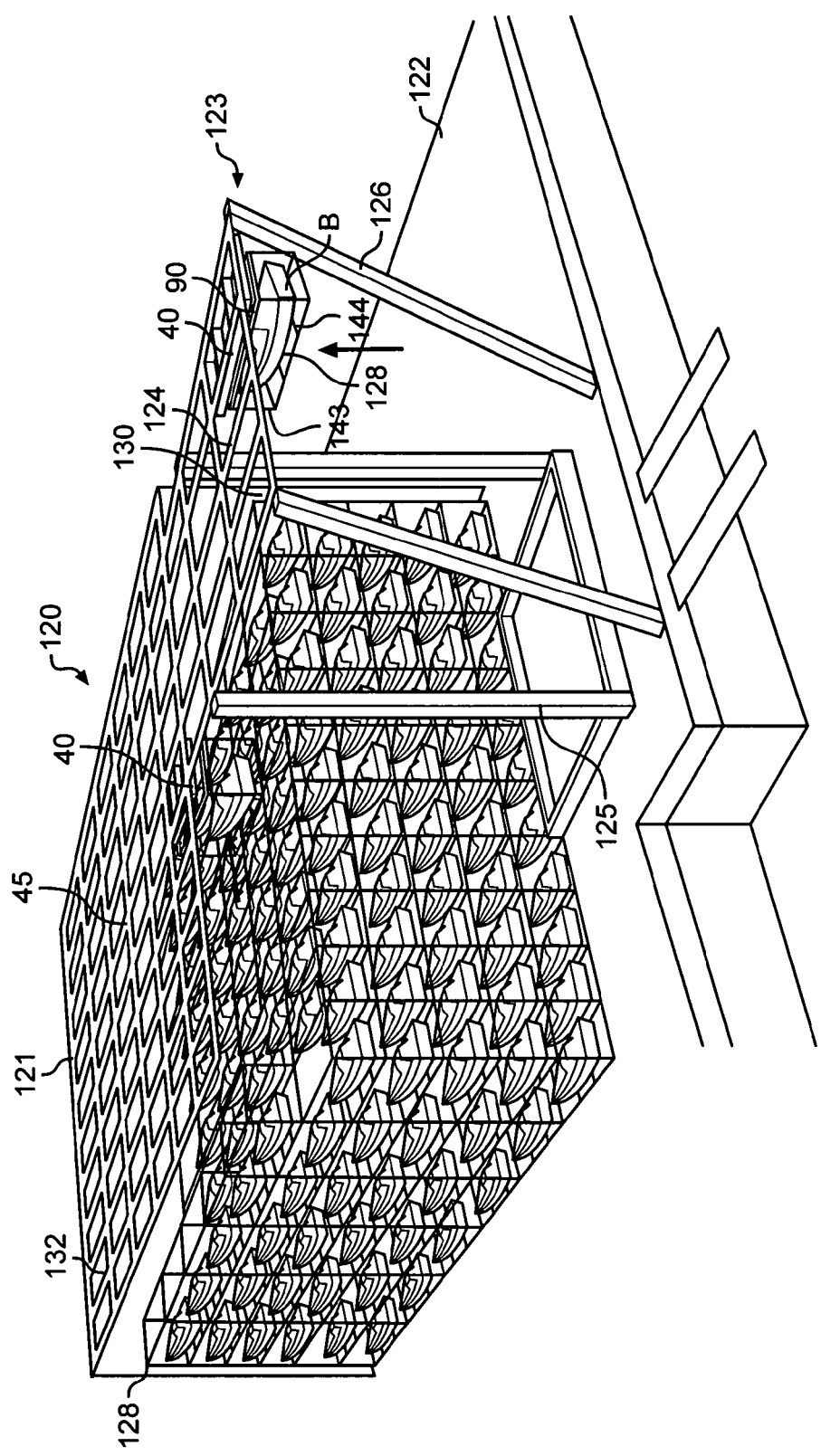
FIG. 8 is a view similar to FIG. 7 wherein the storage unit is shown raised to an upper vertical position wherein the boat storage unit is adjacent to the transfer unit.
Figure 9:
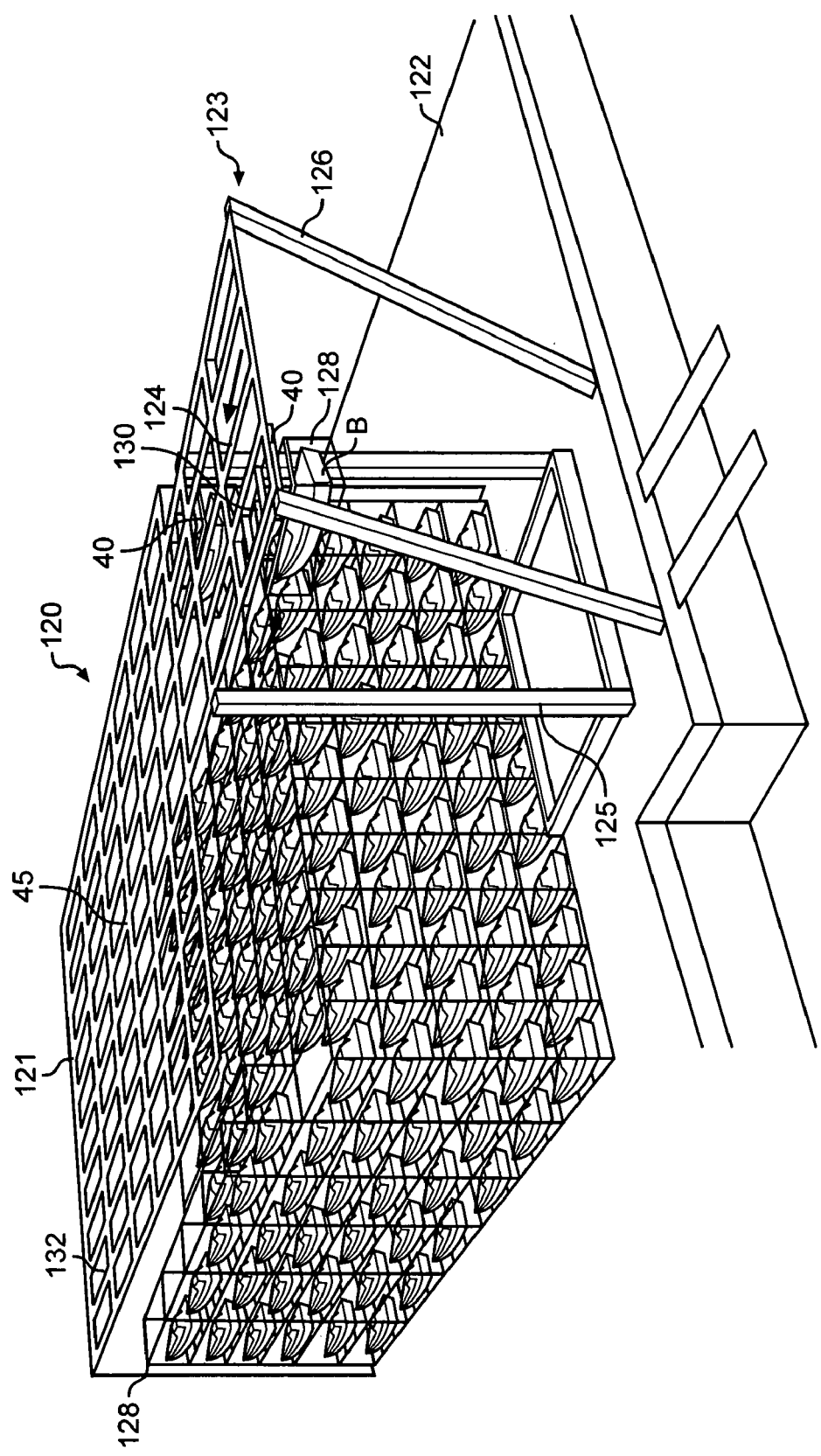
FIG. 9 is view similar to FIG. 7 showing the boat and storage unit carried by the transfer unit being moved laterally to allow another transfer unit to move forward of the storage facility to launch a boat.
Figure 10:
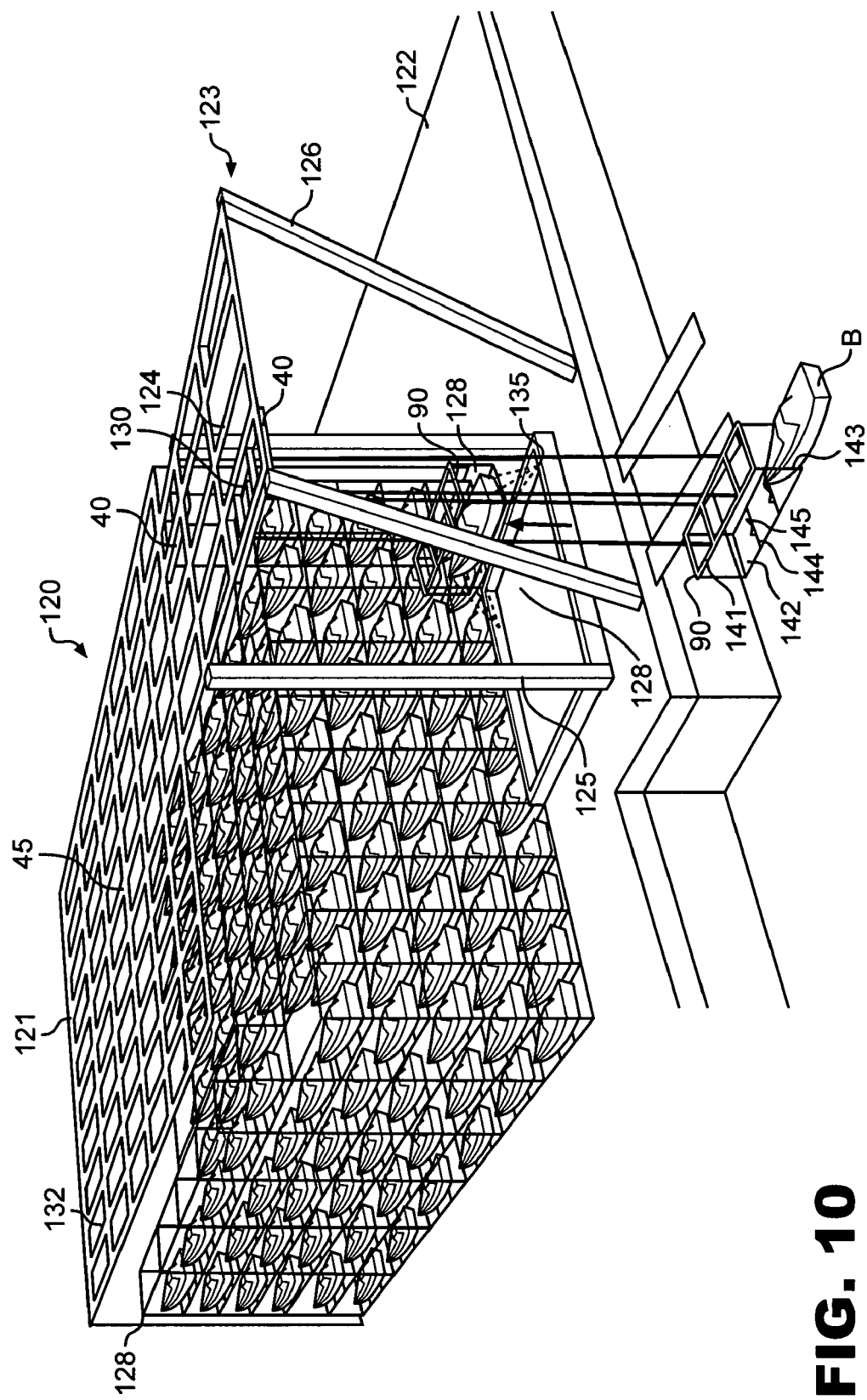
FIG. 10 is a view similar to FIG. 9 showing the boat and storage unit being lowered through a cleaning/spraying area while another boat is being lowered by another transfer unit to a launch position.
Figure 11:
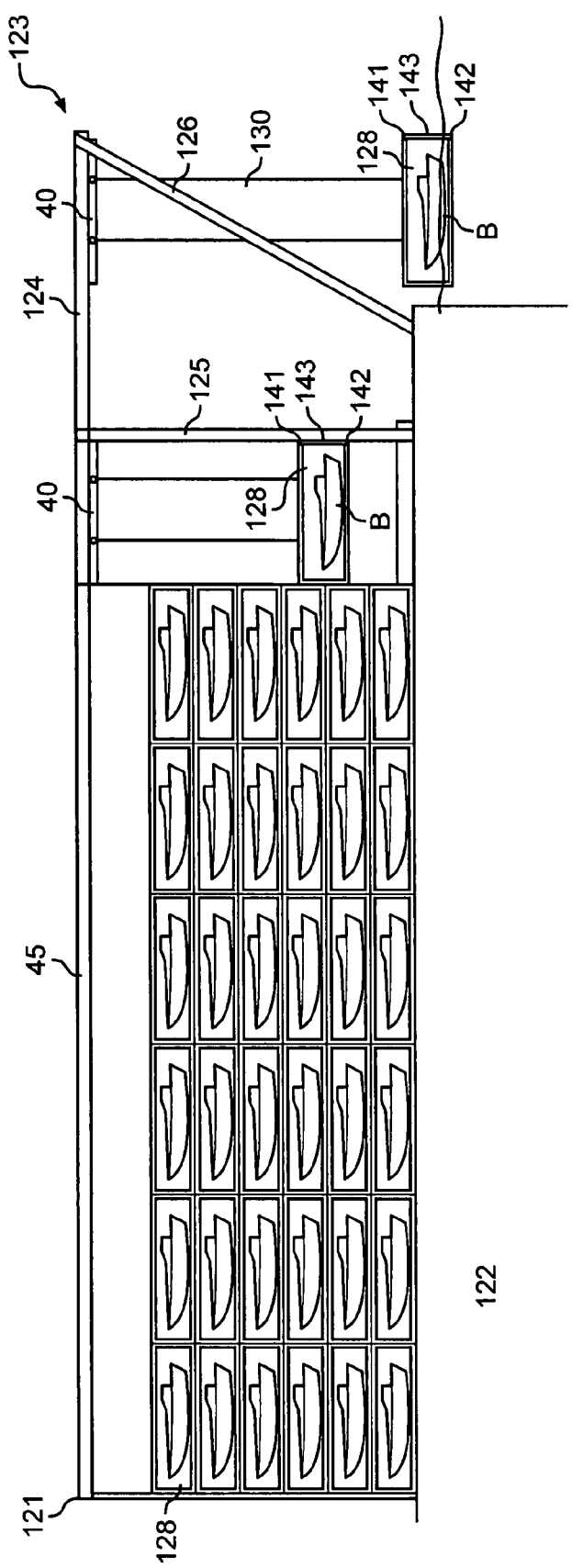
FIG. 11 is a side view on reduced scale of the view of FIG. 10.

Referring to FIGS. 2 and 3, the boat storage units 28,28' are designed to be manipulated by overhead transfer units 40, as shown in detail in FIGS. 12-16, with two such units being shown in FIG. 1. Each carriage includes a body, which in the embodiment shown, includes a rectangular frame 42 that is made of steel or other appropriate material. The frame 42 is supported at each of the four corners thereof by support or pilot hanger shafts 43 that extend upwardly from the frame and through open slots 44 that are provided in an overhead track system 45. The track system is formed by a plurality of hollow steel box beams 46 that are welded or otherwise secured to steel girders or roofing "I" beams of the structure 20 so that the open slots 44 are oriented downwardly. The track system extends above the periphery of each of the cells 30 and 32 in such a manner that the transfer units may be directly and selectively aligned above the cells so as to place a boat and boat storage unit into a cell or elevate the boat storage unit from a cell. Load bearing flanges 47 are formed on opposite sides of the slots on which track roller carriages 48 are movably supported. Each of the pilot hanger shafts 43 is centrally secured to a separate roller carriage.

The box beams 46 that form the track system 45 include both longitudinally extending sections 46A and transverse sections 46B that are oriented at generally right angles with respect to one another. The roller carriages include both upper and lower heavy duty roller ball sets 49 and 50, respectively, that guide the carriages within the box beams 46 with the lower set bearing the weight of the transfer units 40 and the storage units 28. Alternatively, the roller carriages can only include a lower heavy duty roller ball set 50 for guiding the carriages within the box beams 46. Each carriage also includes two pair of wheel sets 51 and 52, with the wheel sets 51 engaging the flanges 47 of the longitudinal sections 46A and the wheel sets 52 engaging the flanges 47 of the transverse sections 46B.

Figure 13:
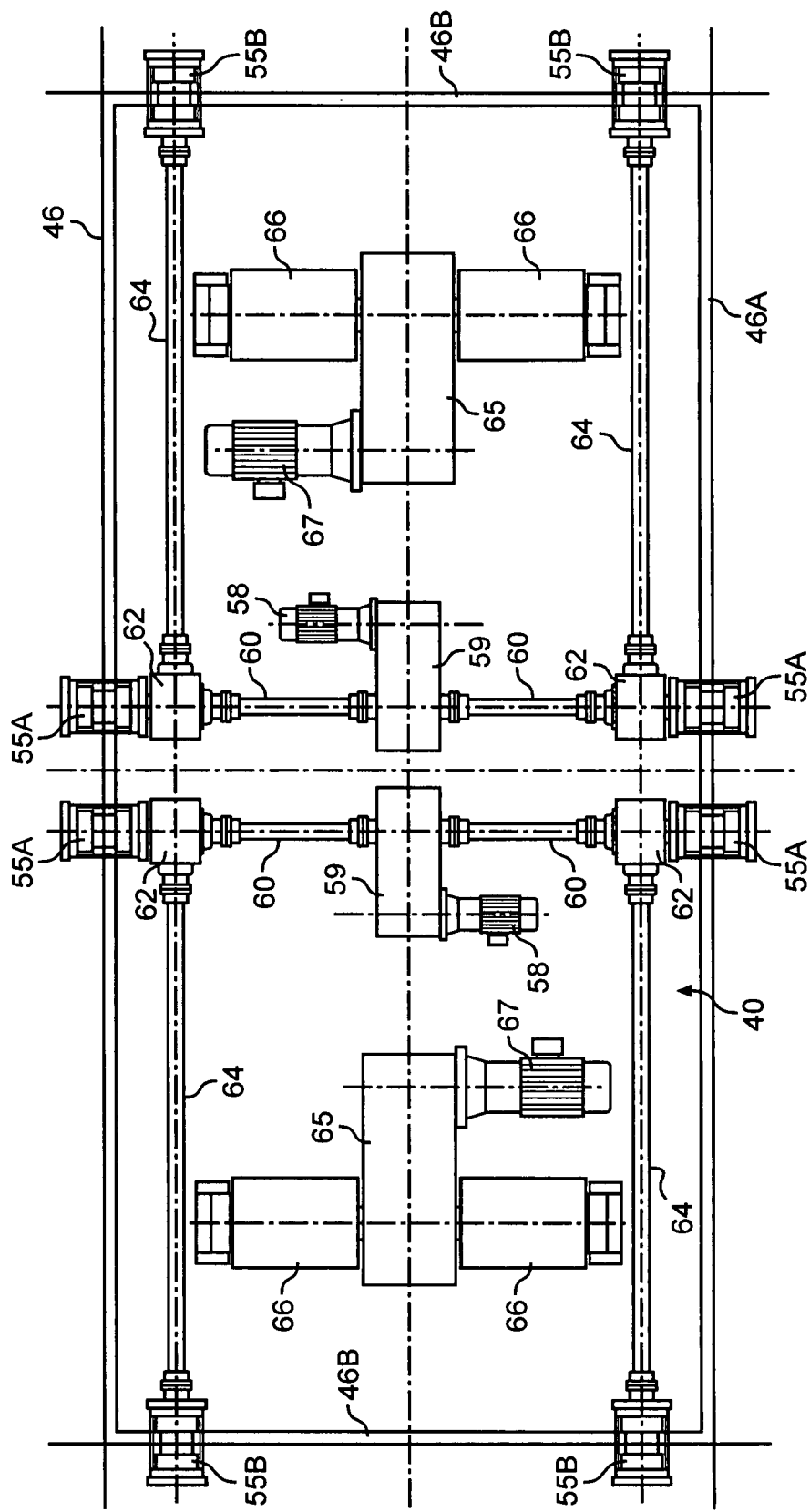
FIG. 13 is a top plan view of the transfer unit of FIG. 12 showing portions of gear racks associated with an overhead guide track system superposed over drive pinions of the transfer unit.
Figure 14:
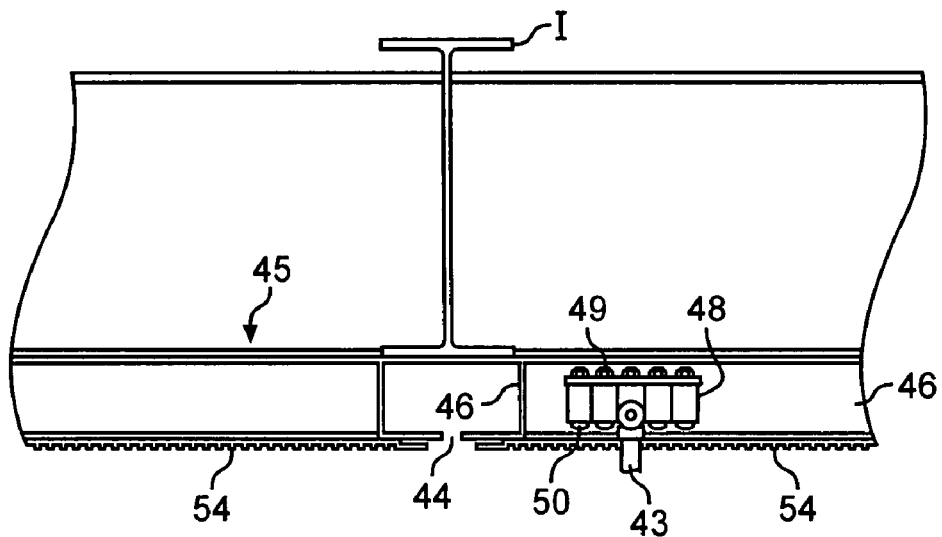
FIG. 14 is a partial cross sectional view through an intersecting section of the overhead tracks of the invention and showing a side view of one of the roller assemblies that support the transfer units of the invention.
Figure 15:
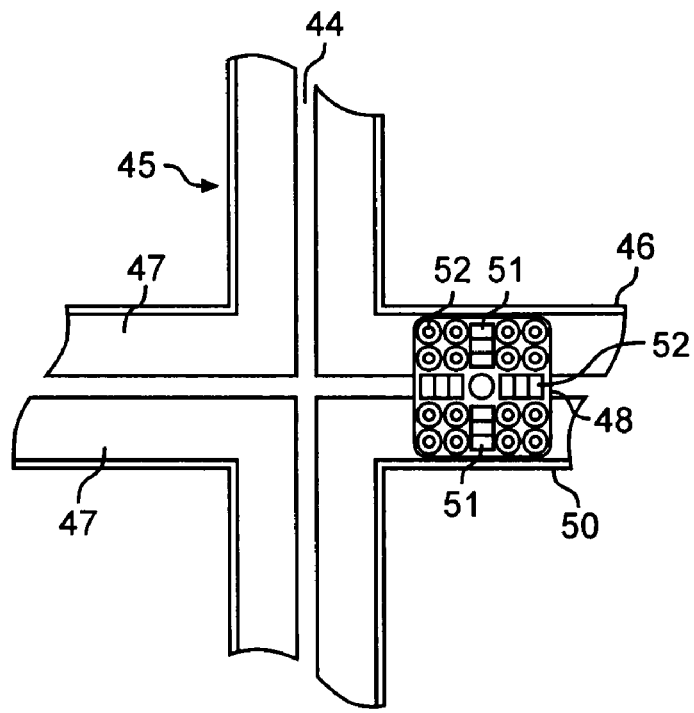
FIG. 15 is a partial top plan view of FIG. 14, showing the intersecting section of the overhead tracks of the invention and one of the roller assemblies that support the transfer units of the invention.
Figure 16:
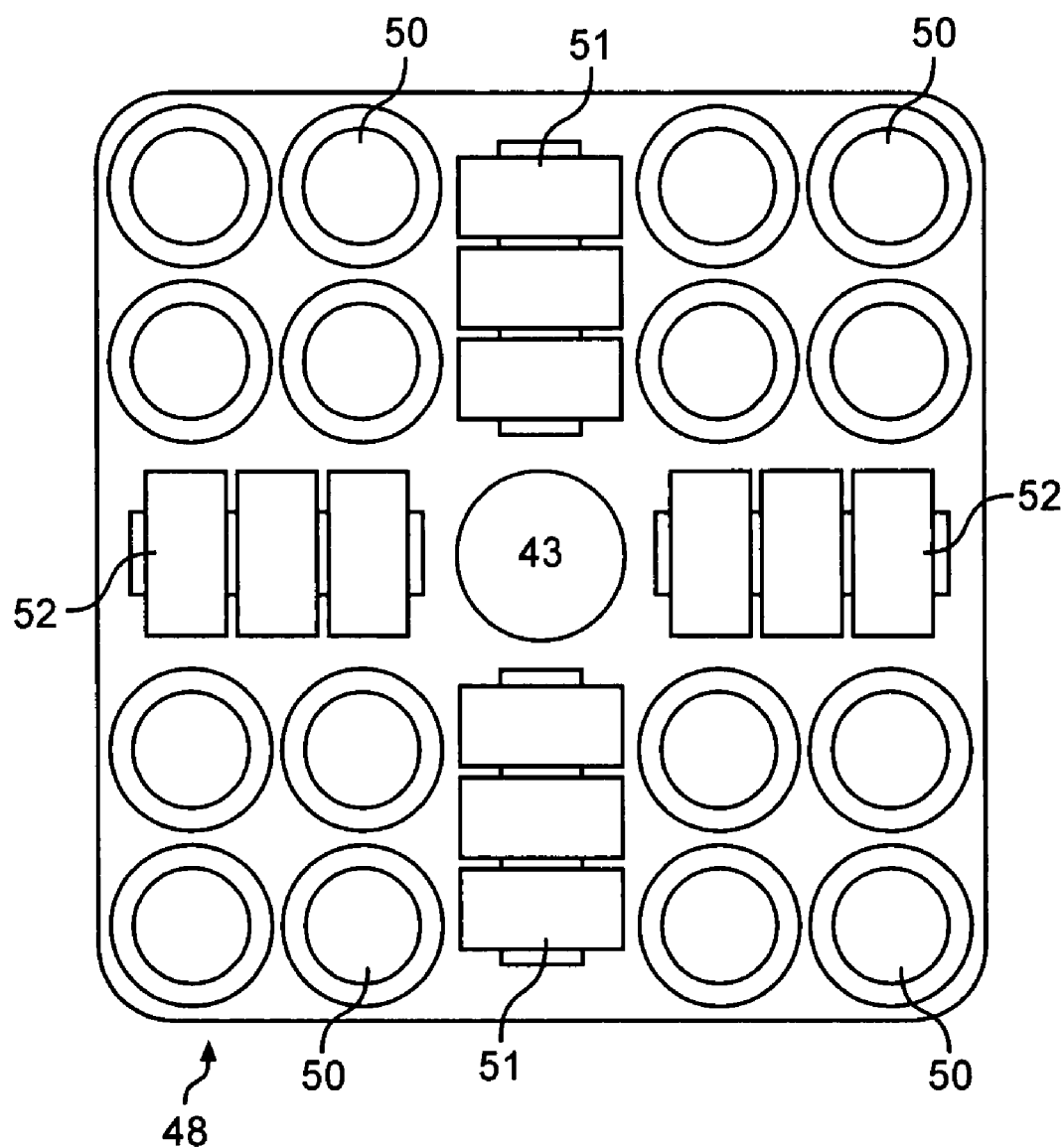
FIG. 16 is a bottom view of one of the roller assemblies of the invention which support the transfer units from the guide tracks.

The lower surfaces of each of the track sections 46A/B are provided with gear racks 54 with which drive pinion gears 55A and 55B of drive assemblies carried by the transfer units 40 are in meshed engagement. With specific reference to FIG. 13, each transfer unit 40 includes eight drive pinion gears 55A/B, two on each side of the frame 42 that are engaged with the gear racks 54. FIG. 13 is a top plan view of the transfer unit 40 showing four gear track sections 46 superimposed over the drive pinion gears 55A/B with two of the sections being the longitudinal track sections 46A and two being the transverse sections 46B. Two drive motors 58 are mounted to the transfer unit 40 having outputs connected through power splitters 59 that drive first output drive shafts 60 that drive the pinion gears 55A through four gear boxes 62. Secondary drive output shafts 64 extend from the gear boxes 62 to the drive pinion gears 55B. In this manner, all the drive pinion gears 55A/B are uniformly driven at the same rate by the two drive motors 58. The gear boxes 62 are controlled such the drive output is only possible to either the pinion gears 55A or 55B at any one time such that to move the transfer unit 40 longitudinally along the track system 46 from the back of the structure 20 toward the front thereof, only the drive pinion gears 55A are powered and such that, when the transfer unit 40 is to move transversely from side-to-side along the track system 46, only the drive pinions 55B are powered.

Figure 17:
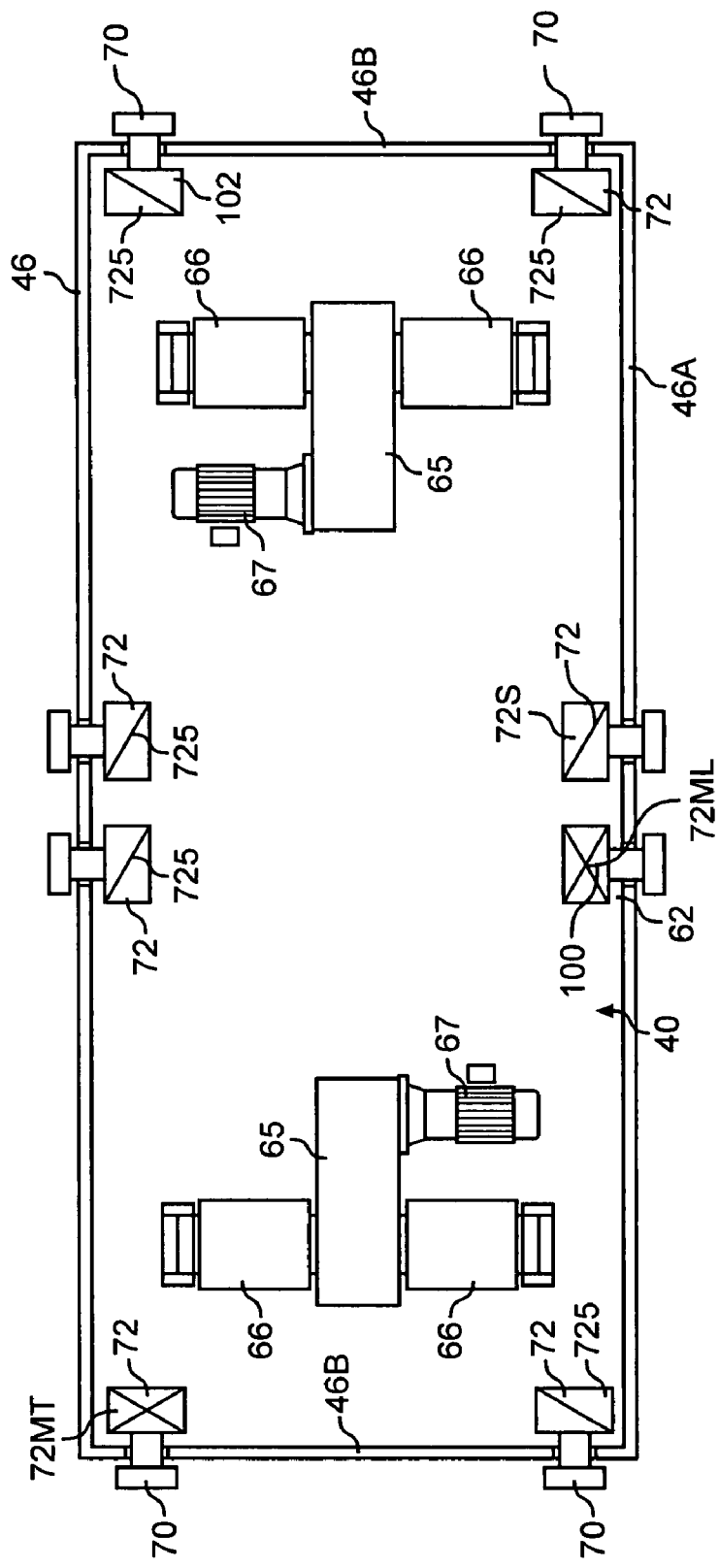
FIG. 17 is a top plan view of an alternative embodiment of the transfer unit of FIG. 12 showing portions of segments of an overhead guide track system superposed over rubber drive wheels of the transfer unit.

In an alternative embodiment shown in FIG. 17, the transfer unit 40 can be provided with rubber drive wheels 70 instead of the gear racks 54 and the drive pinion gears 55A/B. FIG. 17 is a top plan view of the transfer unit 40 showing four gear track sections 46 superimposed over the rubber drive wheels 70 with two of the track sections being the longitudinal track sections 46A and two being the transverse sections 46B. Drive motors 72 are attached to each of the rubber drive wheels 70. The drive motors 72 are controlled by a master encoder 72ML on one of the drive motors 72 along one of the longitudinal track sections 46A and another master encoder 72MT on one of the drive motors 72 along one of the transverse track section 46B. The master controllers 70ML and 70MT control slave encoders 72S on the other drive motors 72. In this manner, the drive motors 70 are controlled such that to move the transfer unit 40 longitudinally along the track system 46 from the front of the structure 20 to the back thereof and vice versa, the master encoder 72ML controls the drive motors 72 along the longitudinal track sections 46A. Likewise, to move the transfer unit 40 transversely along the track system 46 from one side of the structure 20 to the opposite side and vice versa, the master encoder 72MT controls the drive motors 72 along the transverse track sections 46B.

Figure 12:
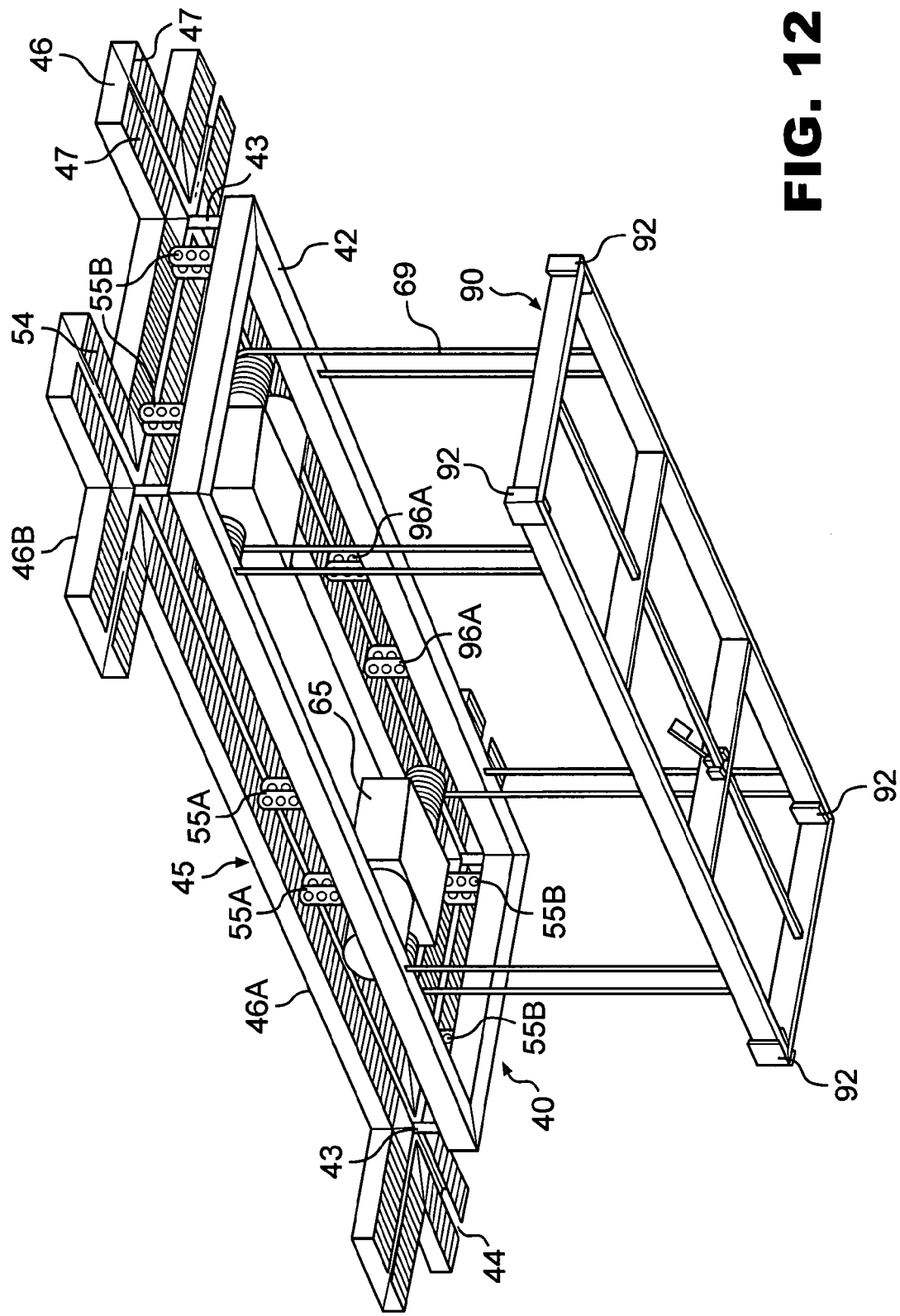
FIG. 12 is a perspective view of one of the transfer units of the invention shown suspended from intersecting sections of overhead tracks along which the transfer units are selectively movable in both "X" and "Y" directions and also illustrating a suspension frame for cooperatively engaging and securing one of the storage units of the invention as the storage units are moved about the system and storage facility of the invention.
Figure 18:
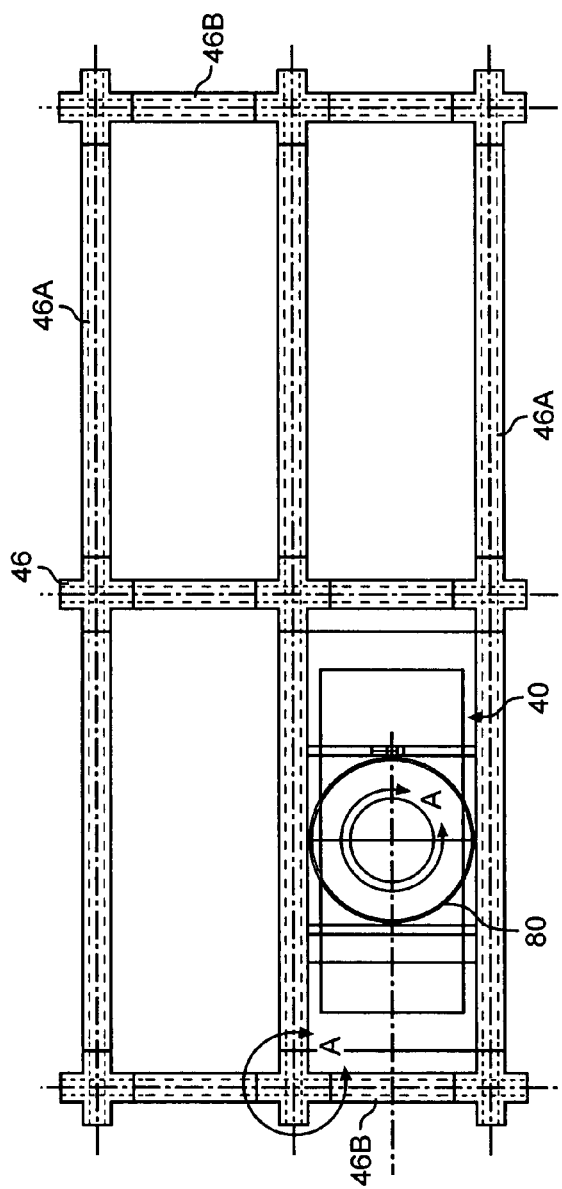
FIG. 18 is a top view showing the transfer unit of FIG. 12 with a trunnion.
Figure 19:
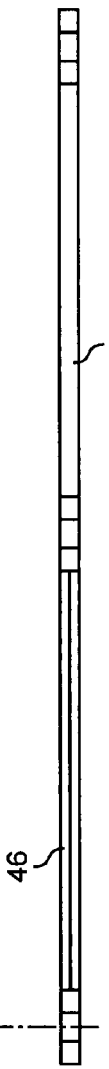
FIG. 19 is a side view of the transfer unit of FIG. 18.
Figure 20:
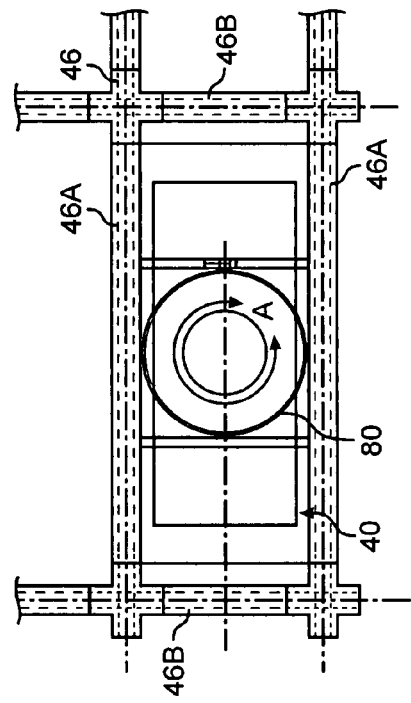
FIG. 20 is a top view similar to FIG. 18.

The transfer unit is designed to raise and lower the boat storage units 28,28' of the invention. To accomplish this, two hoist motors 67 are mounted to the transfer unit. The outputs from these motors are connected through power splitters 65 to pairs of winding drums 66. Cables 69, as shown in FIG. 12, depend from the drums 66 to lower ends that are fixed to a lifting frame 90 that functions as a spreader beam to be in selectively locked engagement with an upper portion of one of the boat storage units 28,28'. As the lifting frame 90 is lowered toward an underlying boat storage unit 28,28', by activation of the motors 67, the frame 90 will engage about the upper periphery of the boat storage unit 28,28', after which, corner locks 92 are automatically tripped to engage the boat storage unit 28,28' such that the unit can be elevated to a position immediately adjacent the transfer unit 40, as illustrated in FIG. 3. In this position, the transfer unit 40 can be moved along the track sections 46A and 46B so as to move the boat and the boat storage unit 28,28' above a desired cell. Further, the boat storage unit 28,28' can be rotated via a trunnion 80, as shown in FIGS. 18-20. After the storage unit 28,28' is located above a desired cell, the boat storage unit 28,28' is lowered until it rests on the floor of the structure 20 or is seated on an underlying storage unit 28,28'.

In the operation of the storage system of the first embodiment of the invention, a boat, as shown in FIG. 1, approaches one of the channels "C" formed between two spaced piers 24 along the front portion 23 of the storage building or structure 20. Before the boat enter the channel "C", an overhead transfer unit 40 maneuvers above the vertically aligned cell 30 and the lifting frame 90, having an empty boat storage unit 28,28' secured thereto, is lowered until the storage unit 28,28' is partial submerged in the channel. The boat is subsequently moved into the storage unit 28,28' through the open end thereof. An operator, preferably with a remote control device, begins to raise the lifting frame until the boat is properly seated on the internal cradles of the storage unit 28,28'. When the boat is properly resting within the storage unit 28,28', the boat and storage unit 28,28' are raised until they are directly beneath the body of the transfer unit 40. In this position, the boat and the storage unit 28,28' are moved to a predetermined cell 32 within the inner portion 21 of the building or structure 20. Thereafter the boat and storage unit 28,28' are lowered into stored position.

When it becomes necessary to retrieve a boat from beneath a stack of boats, one of the transfer units 40 is moved over the appropriate cell 32 and the lifting frame 90 is lowered until it automatically locks to an uppermost boat storage unit 28,28'. The uppermost unit is elevated directly beneath the body of the transfer unit 40 after which the transfer unit 40 is moved above an empty cell 32'. The boat storage unit 28,28' is then lowered into the cell. This process is continued until the desired boat is lifted from the storage cell. Further, the storage unit 28,28' may be rotated via the trunnion 80 so that the boat faces a certain direction. The desired boat then may be launched by maneuvering the transfer unit to one of the launch and retrieval cells 30 and lowered into the water. During the elevating and lowering of the storage units 28,28', they are positively guided by the steel columns 25A, 25B and 25C.

With specific reference to FIGS. 5-11, a second embodiment of storage building or structure 120 is shown having an open inner storage portion 121 that is built on a solid foundation 122. In this embodiment, the transfer units 40 and the track system 45 are the same as with the previous embodiment. In addition, the boat storage units 28,28' and the manner in which they are moved and raised and lowered relative to the various cells 32,32' within the building may be the same, including the vertical columns 25A, 25B and 25C. However, in the present embodiment, the outer portion 123 of the structure is formed as a cantilevered track section 124 that extends forward from some of the tracks of the inner enclosed building structure. As with the previous embodiment, the roof and walls have been removed to show the interior of the storage facility. Generally the inner portion wherein the boats are stored will be enclosed to protect the boats from the elements and vandalism.

The cantilevered track section 124 may also be covered by a roof, however, in some cases a roof may not be used. The cantilevered track section is supported by vertical columns 125 and outrigger columns 126 that extend from secure foundation structures. Although not shown, the columns will be laterally reinforced and stabilized. Between the outer portion of the cantilevered track section, the present embodiment includes a boat rinsing/washing vertical cell 130 through which boats loaded in the boat storage units 128 are selectively movable so that the boats can be cleaned before being moved to storage. Sprayers 135 are mounted along the vertical columns 125 and are positions to complete rinse and/or wash the boats as they are lowered and subsequently elevated within the cell 130. The water being sprayed is collected, filtered and recycled at a collection area 138 at the lower portion of the cell 130.

As previously noted, the inner enclosed portion of the building may be divided into storage cells similar to the ones shown in the previous embodiment or, as shown in the drawing FIGS. 5-11, the inner portion of the building may be open, like a large empty warehouse with the structure of the boat storage units 128 permitting the vertical stacking arrangement shown in the drawings. In this respect, each boat storage unit includes upper and lower rectangular frame components 141 and 142 that are connected by corner vertical struts 143. The lower frame 142 is reinforced by cross members 144 on which are mounted generally V-shaped cradle members 145 that are covered or coated to prevent damage to the finish of a stored boat. The frames are formed of heavy steel tubing or the like that will permit the units to be stable when stacked one on another. In the drawings, the units are shown as being stacked six high. To provide for further stability, the upper and lower corners of the boat storage units are provided with mating male and female couplings such that one storage unit cannot shift relative to another. As with the previous embodiment, at least one end of the storage units is open, at least during boat retrieval and launching, to permit boats to access or depart from the units.

In the use of this embodiment, a transfer unit 40 travels to the cantilevered track section 124 and the boat storage unit 128 is lowered partially into the water, after which a boat enters the storage unit through the open end thereof. The hoists of the transfer unit are operated to lift the storage unit until the boat is properly seated on the cradles 145. After being seated, the boat and storage unit are raised and the transfer unit moved to the spray cell area. The boat and storage unit are lowered and then raised through the rinsing/washing cell and thereafter elevated for movement to the enclosed inner portion of the storage building. The boat storage units are subsequently moved into the inner portion of the facility and vertically stacked. The boats are manipulated and retrieved as previously described.

The system of the present invention can be operated by an operator or operators at the facility, either manually or through the use of computers. Alternatively, the system can be controlled automatically. By way of example, a boat owner when contracting for boat storage may be given a personal code or a bar coded card that may be entered into a control terminal placed at an accessible site adjacent the area where the boats are elevated from the water. The control terminal is connected to a computer system that verifies the number of the access or bar code. At the time of verification, the computer signals one of the transfer units having a correct size of boat storage unit available to move to the pick up area and lower the storage unit between one of the channels "C" between the piers. As a boat enters the open end of the storage unit, sensors mounted to the lifting frame sense when the boat is in proper position and the hoists carried by the transfer unit will initially raise the storage unit until the boat rests on the support cradles. At this time, anyone remaining on the boat departs to one of the piers. The hoists are subsequently automatically activated to raise the boat and the storage unit to a position immediately below the transfer unit. The transfer unit receives storage position information from the computer and automatically moves to a predetermined area or cell within the storage facility and then lowers the boat storage unit to a predetermined storage position.

When an owner wants to retrieve a boat, by entering their code number or by use of the bar coded card, the controller communicates with the computer. The computer communicates with one or more of the transfer units and the transfer unit moves to the appropriate area, and, if necessary lifts and moves one or more boat storage units in order to obtain access to the desired boat. After the desired boat is secured to the lifting frame and the boat raised to beneath the transfer unit, the transfer unit moves to the launch area where the boat storage unit is lowered to the water and the lifting frame lowered to allow the boat to float free of the storage unit.

Such an automatic system can incorporate the use of personal PIN numbers in combination with the access codes and/or bar coded cards to provide additional security. The automated system not only provides for secured storage and access to a boat, but also permits boats to be stored or retrieved from storage at any time, thus making the system completely compatible to the individual boat owners.

Further, in another alternative embodiment, the boat storage system of the present invention also includes means for identifying each boat storage unit. Such identification means may include a radio frequency identification system or a bar code system. For example, each boat storage unit 28,28' includes a radio frequency identification tag, and the warehouse structure 20 is equipped with various radio frequency readers. Accordingly, the readers are able to obtain data from the identification tags regarding the position of each storage unit 28,28' in the warehouse 20. The readers then transfer this information to the computers for analysis and storage.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

We claim:

1. An overhead boat storage system for selectively elevating boats from a body of water, storing the boats within a storage facility and retrieving the boats from the storage facility for launching, maintenance or transport, the storage system comprising: a storage structure including a first section for storing the boats and a second section extending over the body of water, an overhead track system including first pairs of spaced and parallel tracks that extend in a first direction within said first section of said storage structure and second pairs of spaced and parallel tracks that extend in a second direction, which is perpendicular to the first direction, within said first section of said storage structure, the first and second pairs of tracks being coplanar and intersecting with one another at spaced open intersections, the overhead track system further including at least one third pair of spaced and parallel tracks that extends over the body of water and which are aligned with one of the first or second pairs of spaced and parallel tracks, at least one powered transfer unit mounted to travel along said overhead track system so as to be movable transversely in an X-Y plane above said first section of said storage structure and along at least one of an X or Y direction over said second section of said storage structure, a plurality of boat storage units each including a frame supporting at least one boat supporting means, said at least one transfer unit including hoist means for selectively engaging said boat storage units, each of said frames being of a size to fully enclose a boat therein and being constructed having upper and lower portions that extend above and below a boat to be stored therein and including vertical struts that reinforce the frames such that the frames are vertically stackable one above another with boats stored therein within the first section of the storage structure, each frame defining an opening to permit a boat to be floated into the frame and onto or from said at least one boat supporting means when one of said boat storage units is lowered into the body of water by said hoist means, whereby said at least one transfer unit can be maneuvered along said overhead track system so as to lower one of said boat storage units into the body of water to retrieve a boat from the body of water and elevate the retrieved boat from the body of water and thereafter convey the elevated boat to said first section of said storage structure wherein the boat and the boat storage unit are lowered into a stored position and wherein said boat storage units are selectively maneuvered within said first section of said storage structure to obtain access to said boat storage units and wherein launching of boats from the system is accomplished by elevating a selected boat storage unit from a stored position and thereafter conveying the selected boat storage unit from said first section to said second section of said storage structure and subsequently lowering the selected boat storage unit into the body of water such that a boat carried thereby is floated free of the selected boat storage unit.

2. The overhead boat storage system of claim 1 wherein said second section of said storage structure includes at least two spaced pier structures defining a channel therebetween of a size to permit one of said boat storage units to be lowered therein to permit a boat to be floated into or from the boat storage unit, and guide means extending vertically between said at least two spaced pier structures and said at least one third pair of tracks of said overhead track system to thereby guide the boat storage unit as the boat storage unit is raised and lowered relative to the channel.

3. The overhead boat storage system of claim 2 wherein said guide means includes at least one set of four vertical columns that extend between said at least two spaced pier structures and said at least one third pair of tracks of said second section of said structure.

4. The overhead boat storage system of claim 1 wherein said at least one third pair of spaced and parallel tracks extends outwardly relative to said first section of said storage structure so as to be above the body of water.

5. The overhead boat storage system of claim 4 further including a boat rinsing area within said second section of said storage structure, said boat rinsing area including spraying means for spraying boats supported within said boat storage units as said boat storage units are being conveyed by said at least one transfer vehicle.

6. The overhead boat storage system of claim 4 wherein said at least one third pair of spaced and parallel tracks includes pairs of tracks that intersect generally perpendicularly with one another.

7. The overhead boat storage system of claim 1 further including a boat rinsing area within said storage structure, said boat rinsing area including spraying means for spraying boats supported within said boat storage units as said boat storage units are being conveyed by said at least one transfer vehicle.

8. The overhead boat storage system of claim 7 wherein said boat rinsing area is within said second section of said storage structure and wherein said boat rinsing area further includes means for collecting, filtering and recycling water sprayed within said boat rinsing area.

9. The overhead boat storage system of claim 1 wherein said upper and lower portions of said frame of each of said boat storage units includes a generally rectangular frame and the frames being connected by the vertical struts.

10. The overhead boat storage system of claim 9 wherein said frame of each of said boat storage units is generally open at least one end thereof to thereby permit a boat to be floated to and from said at least one boat supporting means.

11. The overhead boat storage system of claim 9 wherein at least one of said boat storage units is substantially enclosed by wall portions to thereby protect a boat in storage from damage.

12. The overhead boat storage system of claim 1 wherein at least one of said boat storage units is substantially enclosed by wall portions to thereby protect a boat in storage from damage.

13. The overhead boat storage system of claim 1 wherein said at least one boat supporting means is adjustable for accommodating boats of different sizes.

14. The overhead boat storage system of claim 1 further including controlling means for automatically electronically controlling the storage and/or the retrieval of boats relative to said first section of said storage structure, said controlling means including electronic means for identifying a boat or a boat storage unit and activating means for activating said at least one transfer unit to appropriately store or retrieve from storage an identified boat or boat storage unit.

15. The overhead boat storage system of claim 1 wherein said first section of said storage structure has a plurality of vertically oriented storage cells for storing said boat storage units in a vertically stacked relationships to each other.

16. A method for storing boats in a protected storage structure having a first section in which boat storage units in which boats are housed may be vertically stacked relative to one another and a second section from which boats may be elevated for storage or launched relative to a body of water and wherein the boat storage units are selectively raised, lowered and maneuvered within the storage structure using at least one transfer vehicle that is movable along an overhead grid track system having intersecting pairs of tracks that are oriented perpendicular with one another and which at least one transfer vehicle includes a hoist assembly including means for engaging one of the boat storage units, the method including the steps of:

A. Moving the at least one transfer unit along the overhead grid track system so as to be within the second section of the storage structure above the body of water and thereafter lowering a boat storage unit carried thereby into the body of water;

B. Enclosing a boat within the boat storage unit by moving a boat into the lowered boat storage unit and elevating the boat storage unit to engage and support the boat;

C. Elevating the boat storage unit so as to be more closely spaced to the at least one transfer vehicle; thereafter, and with the boat storage unit elevated close to the vehicle D. Maneuvering the at least one transfer vehicle along the overhead grid track system so as to be above a predetermined storage area in the first section of the storage structure;

E. Lowering the boat storage unit being stored into the predetermined storage area and releasing the boat storage unit;

F. Retrieving a boat within the boat storage unit by moving the at least one transfer vehicle along the overhead grid track system and above the predetermined storage area and lowering a hoist assembly to engage the boat storage unit;

G. Elevating the engaged boat storage unit and thereafter moving the at least one transfer vehicle along the overhead grid track system directly to the second section of the storage structure; and H. Lowering the boat storage unit into the body of water and moving the boat stored therein from the boat storage unit.

17. The method of claim 16 further including an additional step of positively guiding the boat storage unit as it is raised and lowered relative to the body of water.

18. The method of claim 16 further including an additional steps of moving the boat storage unit to a boat rinsing area and rinsing a boat carried within the boat storage unit before conveying the boat storage unit to the first section of the storage structure.

19. The method of claim 16 further including additional steps of electronically accessing an electronic control device for controlling movement of the at least one transfer vehicle and electronically requesting the retrieval of a predetermined boat or boat storage unit, whereupon the receipt of a retrieval request, the at least one transfer vehicle automatically retrieves the requested boat storage unit and transfers the retrieved boat storage unit to a requested location.

20. The method of claim 19 further including additional steps of placing an identifying means for electronically identifying each of the boat storage units on the boat storage units and providing remote readers for communicating with the identifying means whereby the location of each boat storage unit is easily determined.

* * * * *